United States Patent [19]
Procter

[11] 3,947,130
[45] Mar. 30, 1976

[54] METROLOGICAL TV MICROSCOPE
[75] Inventor: Samuel Anderson Procter, Minneapolis, Minn.
[73] Assignee: Control Data Corporation, Minneapolis, Minn.
[22] Filed: Dec. 3, 1974
[21] Appl. No.: 529,149

[52] U.S. Cl. ................. 356/167; 356/160; 250/560
[51] Int. Cl.² ........................................ G01B 11/02
[58] Field of Search ........... 356/158, 160, 167, 168; 250/560; 340/146.3 Q

[56] References Cited
UNITED STATES PATENTS
| | | | |
|---|---|---|---|
| 3,546,377 | 12/1970 | Troll | 356/168 |
| 3,758,214 | 9/1973 | Mangelsdorf | 356/160 |

*Primary Examiner*—John K. Corbin
*Assistant Examiner*—Wm. H. Punter
*Attorney, Agent, or Firm*—Edward L. Schwarz

[57] ABSTRACT

Apparatus for measuring a dimension of a specimen whose image is projected by an optical system into a television camera or other light scanner, by forming the ratio of the time required to scan across the unknown dimension, with the time required to scan across the image of a reference dimension. The reference dimension is the width of an object placed in a focal plane of the optical system other than the focal plane in which the specimen having unknown dimension to be measured is placed.

In a preferred embodiment, the apparatus includes a variable frequency oscillator which performs the measurements for the times required to scan these two dimensions. A feedback loop adjusts oscillator frequency so that the number of oscillations during the scan of the reference object equals the number stored in a register which can be altered only manually. This preferred embodiment can be calibrated by placing an object of known dimension within the field of view reserved for the specimen. Oscillator frequency is adjusted by manually varying the contents of the manually alterable register until the number of cycles occurring during a scan across the known dimension is a selected power of 10 of the value of the known dimension. The oscillator frequency is automatically adjusted thereafter by the feedback loop to maintain the number of oscillations equal to the contents of the manually alterable register during subsequent reference object scans. The number of cycles which occur during a scan across a specimen multiplied by the selected power of 10 is the dimension of that specimen.

13 Claims, 7 Drawing Figures

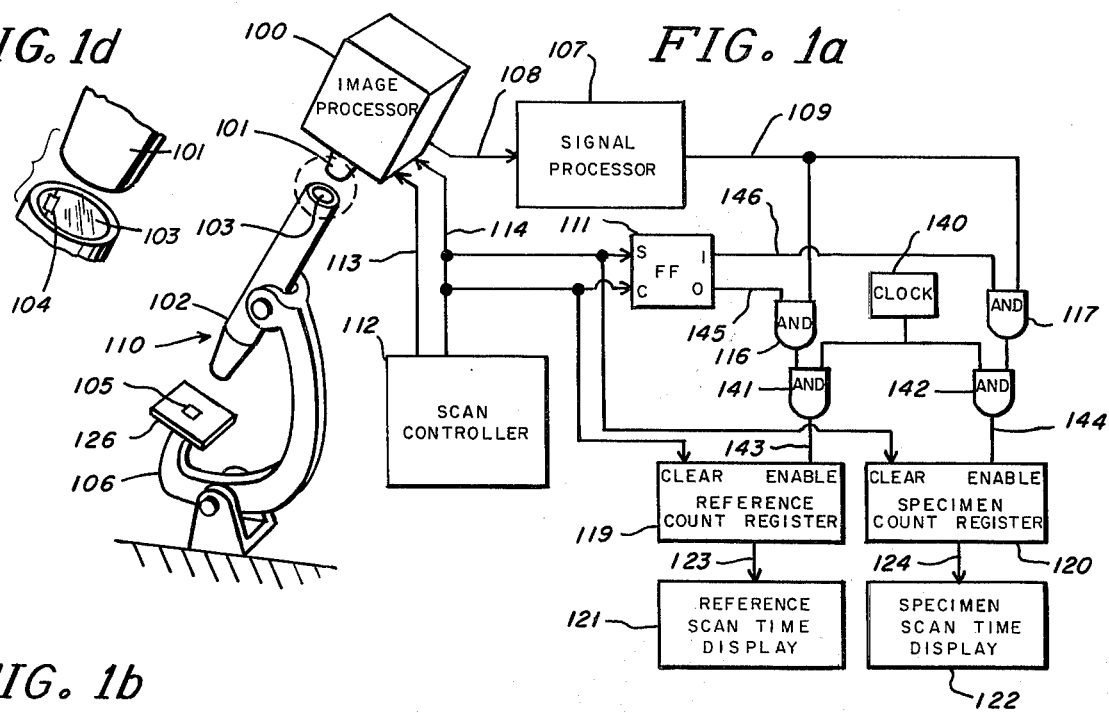
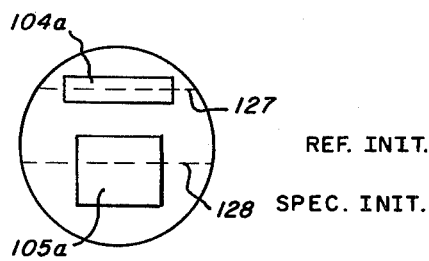
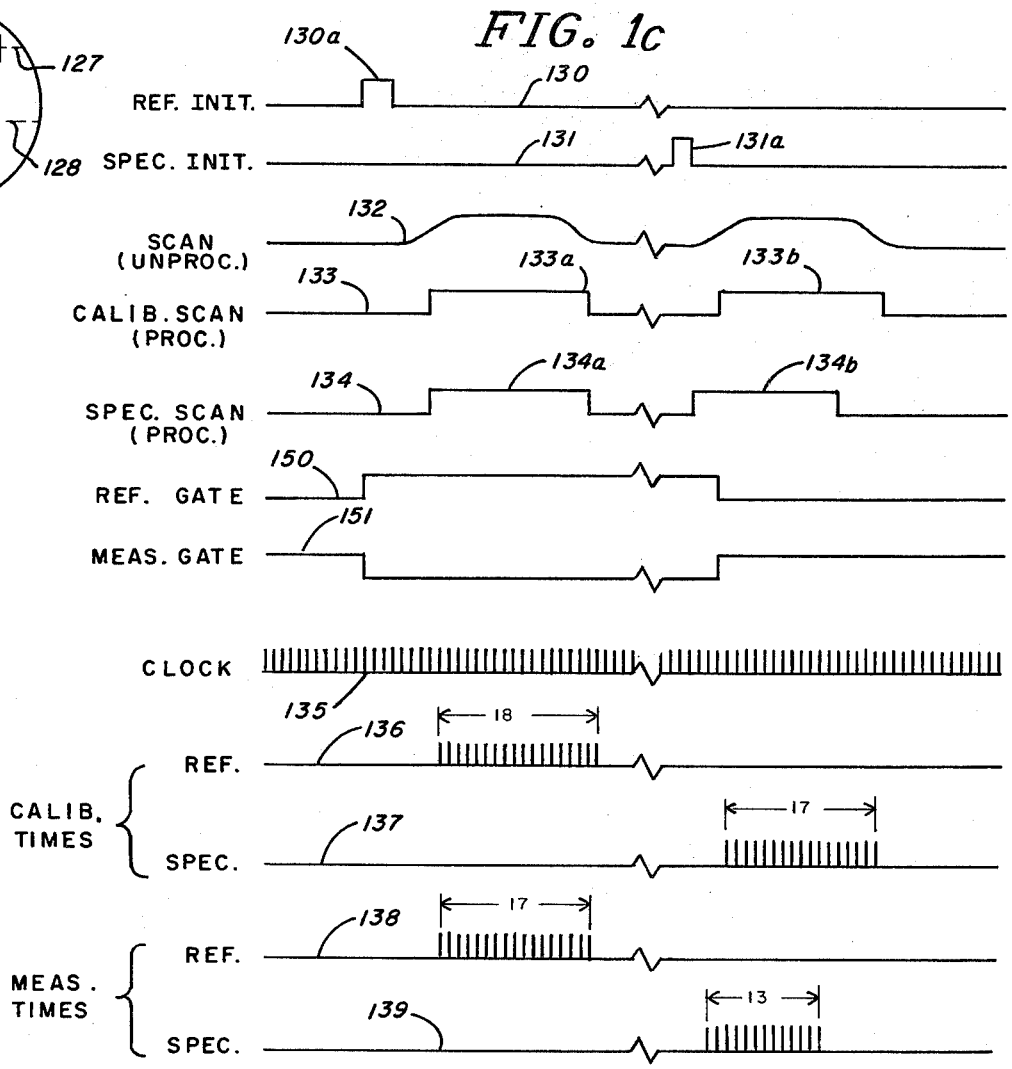

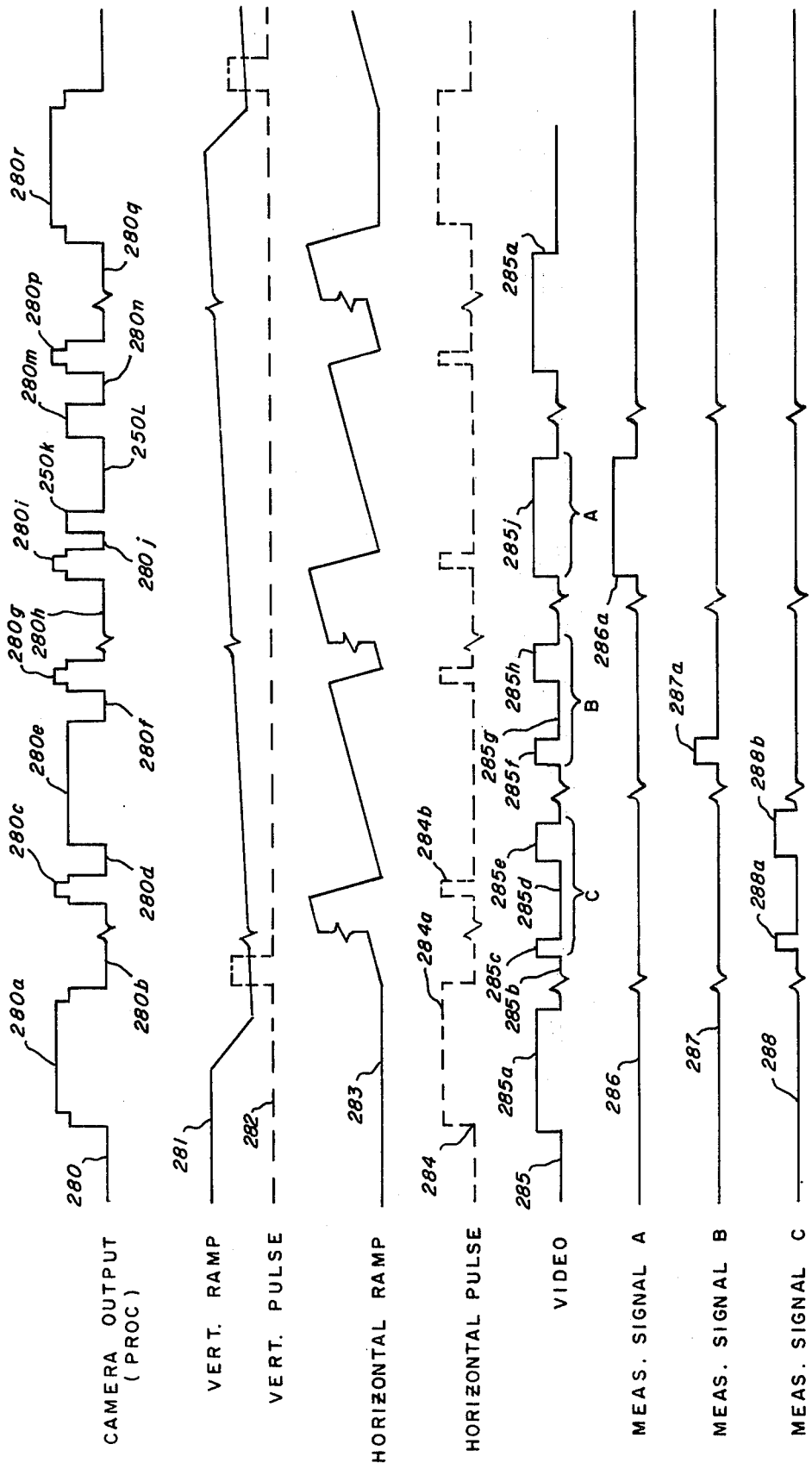

METROLOGICAL TV MICROSCOPE

BACKGROUND OF THE INVENTION

1. Field of the Invention

The subject matter of this invention relates to those devices which perform mensuration and particularly those which are adapted to determine microscopic lengths. It is most closely related to those devices which employ a television image of the device as an aid to the operator in performing the measurement.

2. Description of the Prior Art

In the most widely known device employing electronic means such as a closed circuit television apparatus to display a magnified image of the object to be measured, the viewing screen of the television apparatus has superimposed on it in some fashion a grid pattern whose individual increments correspond to known dimensions in the field of view in which the object is located. By careful interpolation between the lines forming the grid pattern, the actual dimension of the object can be determined with reasonable accuracy. A modification on this scheme allows manual control of the position of a pair of markers in the displayed field of view on the television monitor screen. The distance between the markers is electronically correlated to the actual corresponding distance in the field of view and the numerical distance between the markers can be automatically displayed. By properly manipulating the position of the markers, the actual horizontal distance between any two features on an object in the field in view can be determined. Unfortunately, both of these devices suffer from two failings. On the one hand, judgment of the operator is required in interpolating between the grid markings and in positioning the markers. Since this requires subjective operator judgment, measurements are not always as precise as is desired. Secondly, inherent instability in the electronic apparatus associated with both these devices introduce additional errors. For these reasons, accuracy not as great as desirable for certain applications. This apparatus solves to a great extent, many of these problems.

The most closely related U.S. Pat. Nos. of which the inventor is aware are 3,737,856 (Lehrer, et al.); 3,645,377 (Troll); and 3,740,467 (Kubo, et al.).

SUMMARY OF THE INVENTION

An optical system such as a microscope is used to create an image of the specimen to be measured. The image created by the optical system is projected on a light-sensitive strip (hereafter, specimen strip) which produces a scan signal whose variations as a function of time correspond to variations as a function of position along the specimen strip of a pre-selected quality such as intensity, of the light or other radiation falling on the strip. The specimen dimension to be measured must be oriented so as to cause images of the marks defining its end points to fall upon the specimen strip. A scanner sequentially scans along the strip at a precise speed and produces a scan signal which reflects the variations in the light quality along the strip caused by these marks. In the more usual and preferred system, this light sensing function can be performed conveniently and accurately by a standard television camera with the preselected light quality sensed by the camera being intensity of the light. When a television camera is used, the scan signal is in fact the video signal, and the marks defining the dimension to be measured need only cause detectable variations in the video signals. The novel elements of the invention work in concert with the optical system and the sensing strip, whatever embodiment it assumes, to produce a highly accurate measurement of the desired dimension.

A reference object is located at some point within the light path in the optical system allowing a focussed image of the reference object to be projected thereby, i.e. at a focal plane. Conveniently, the reference object may be located in the eyepiece or ocular lense of the optical system. Another light-sensitive strip (reference strip), similar to the previous one mentioned is located so that the optical system image of the reference object falls on it with an image of a reference dimension having end points defined by marks whose images fall along the reference strip and produce variations in the reference strip signal. This can be quite easily accomplished when a television camera is used by locating the reference object within the image path so that it occupies a small portion, preferrably the top 15%, of the scanning area, with the specimen to be measured conveniently located in the remaining area. The image created by the reference object when so located has an apparent width projected on the image of the actual field of view beneath the objective lens. It is most convenient, although not necessary, to scan the reference and specimen strips sequentially. The scan signals are transmitted to a detector which produces a mark signal for each variation in the scan signal caused by a mark. It is important that the time between the two mark signals from a strip be equal to the time between the two mark-caused variations in the scan signal.

A timer receives the reference object mark signals and produces a time signal which encodes the time interval between them. Either the same or a second timer similarly receives the mark signals caused by the specimen and produces a second time signal encoding the time elapsing while scanning the specimen. These two times may be displayed directly and their ratio used to compute the specimen dimension in terms of units of apparent reference object width. It is usually more convenient, however, to calibrate the apparatus by determining the apparent distance in the field of view spanned by the image of the reference in standard length units, by forming the ratio of the scan time for the reference object, and for a calibration specimen of known length positioned on the stage as are the specimens of unknown length. Then the length of the unknown dimension of a specimen in standard units is the ratio of the scan times of the reference object and the specimen multiplied by the apparent length of the reference image. These arithmetic operations can be made electronically and the actual distance in standard units between the two marks defining the unknown dimension displayed in some convenient fashion.

However, a preferred embodiment uses a somewhat different approach. The timer comprises an oscillator whose frequency can be varied widely during the calibration step and be essentially fixed during operation. A register is provided which may be altered only manually and in which may be entered any number of cycles which may occur in the oscillator output signal during the time between the two mark signals generated by the reference strip. During operation the number of oscillator signal cycles during each reference object scan is compared to the count in the manually alterable register. If not equal thereto, the oscillator frequency is adjusted on succeeding scans by a feedback loop until equality occurs. The advantage of this embodiment is realized by proper calibration. A calibration specimen of known dimension is placed in the field of view and the contents of the manually alterable register is altered by the operator until the number of oscillator cycles which occur during the scan across the calibration specimen is a convenient power of 10 of the actual dimensional units of the known dimension. Thereafter, when specimens of unknown dimensions are placed in the field of view, the number of oscillator signal cycles occuring during the scan between the two mark signals generated by it is, the unknown dimension, in the units in which the known calibration specimen dimension is expressed, when multiplied by the selected power of 10.

There are several other improvements to this preferred apparatus which permit increased flexibility in its use, and greater ease of operation. Among these are the capability of manually selecting which scan line, when a television camera is used, provides the specimen mark signals; selecting the kind of signal changes causing generation of a mark signal; and selecting the portion of a scan line in which the specimen mark signals occur. Use of a television monitor which displays visual indication of these manipulations superimposed upon an actual picture of the object carrying the unknown dimension is a great convenience, and can be easily implemented when a television camera comprises the light-sensitive strips.

Accordingly, one object of this invention is to provide accurate measurement of microscopic distances.

Another object is to eliminate operator judgment in making these measurements.

Still another object is to automatically compensate for drift during operation, of the apparatus performing these measurements.

Yet another object is to provide apparatus capable of making such measurements regardless of the magnification employed in the optical system.

Other objects and purposes will become apparent from the detailed description which follows.

BRIEF DESCRIPTION OF THE DRAWINGS

FIG. 1a is a block diagram of a simple generalized embodiment of the invention.

FIG. 1b discloses the image seen by the scanner of FIG. 1a.

FIG. 1c is a diagram of signals associated with the apparatus of FIG. 1a.

FIG. 1d is a blow up of the dotted circle area of FIG. 1a.

FIG. 2c is a diagram of signals associated with the apparatus of FIGS. 2a and 2b.

DESCRIPTION OF THE PREFERRED EMBODIMENT

Figure 2A:
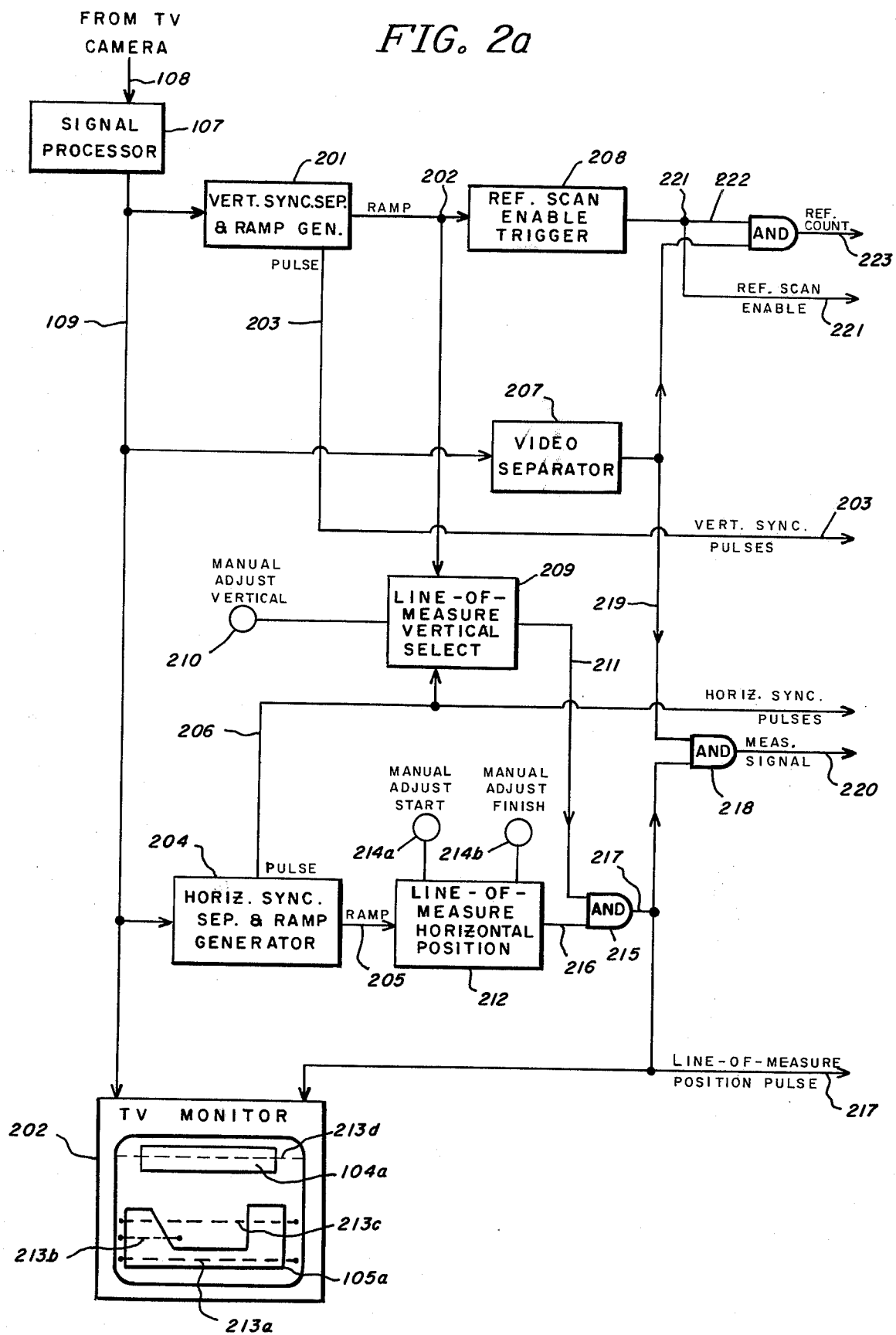
FIGS. 2a and 2b comprise a detailed block diagram of a preferred operational embodiment, and are intended to be juxtaposed, FIG. 2a to the left of FIG. 2b, to form the complete diagram.

Turning first to FIG. 1a, therein is disclosed an optical system 110 designed for magnification of specimens within its field of view and which may conveniently be any suitable commercially available microscope. Optical system or microscope 110 comprises a barrel 102 containing the lenses or mirrors accomplishing the magnification, and a frame 106 supporting barrel 102 and stage 126. Specimen 105 bearing the dimension to be measured is mounted on stage 126 within the field of view. Ocular lens 103 is mounted at the end of barrel 102 furthest from specimen 105. Reference object 104 (FIG. 1d) is attached to ocular lens 103 in such a position as to cause its image 104a (FIG. 1b) to occupy a position near the edge of the optical system image.

Image processor 100 has an aperture 101 through which the image from optical system 123 is projected onto at least two light sensitive strips internal to processor 100. It is preferable that processor 100 comprise a conventional television camera, in which case each of these light sensitive strips will correspond to one photosensitive row within the television camera scanned by the electron beam during one horizontal sweep. FIG. 1b displays a typical image of the field of view received by image processor 100, image 104a being that of the reference object 104 and image 105a being that of specimen 105. Dotted lines 127 and 128 correspond to the position which the light sensitive strips may conveniently occupy with respect to the optical image projected on them.

As far as operation of this invention is concerned, it is unimportant whether a television camera is used as image processor 100, or if instead a pair of light sensitive strips or some other type are employed. However, it is necessary that the strips can be scanned in some fashion to produce a signal which varies as a function of time as a preselected quality of light falling on the strip varies with respect to distance from a fixed point on the strip. That is, the function of image processor 100 is to convert the magnitude of some quality of light, such as intensity, with respect to position along the strip, to a varying electrical signal in which time, the independent variable, corresponds to position along the strip. For good accuracy, it is almost imperative that the scan velocity be constant and identical for both strips, since the non-linearity resulting will then require additional and complicated calibration and compensation apparatus.

Scan controller 112 produces first and second initiate signals which are supplied to image processor 100 on signal paths 113 and 114 respectively. Generation of initiate signals may be the result of manual actuation of a switch or automatic and continuous. The first initiate signal causes a scan along the reference strip on which the reference image falls, to occur; similarly, the second initiate signal causes a similar scan at identical speed along the specimen image sensing, or simply, specimen strip. The reference (first) and specimen (second) initiate signals are shown in FIG. 1c as pulses 130a and 131a respectively.

The scan signal output of image processor 100 is sent to signal processor 107 via signal path 108. In FIG. 1c the scan signal output of image processor 108 is shown as waveform 132. Signal processor 107 squares up the rise and fall of the unprocessed scan signals, resulting in a signal on path 109 having a square pulse for each scan across images 104 and 105 and proportional in duration to the width of the object across whose image the scan swept. Typical processed scan signals are shown as calibration scan waveform 133 and measurement scan waveform 134 in FIG. 1c. The output of signal processor 107 has only two levels, the analog time value being contained in the width of the pulse and whose leading and trailing edges comprise the aforementioned mark signals.

The processed scan signal is converted by the remaining elements of FIG. 1a into a visual digital time signal which may be used by the operator to either calibrate the apparatus or perform a measurement. This remaining apparatus employs digital logic. For convenience, it can be assumed that a binary 0 in each element corresponds to the low voltage level in reference initiate signal 130 adjacent pulse 130a, and that a binary 1 is represented by the higher voltage of pulse 130a itself. Reference initiate signal 130 is applied to the clear (C) input terminal of flip-flop 111 and the specimen initiate signal 131 is similarly applied to the set (S) terminal of flip-flop 111. The 0 output of flip-flop 111 becomes 1 after each reference initiate pulse 130a and remains a 1 until a specimen initiate pulse 131 is applied, and is shown as reference gate signal 150. The 1 output of flip-flop 111 is the inversion of the 0 output and is shown by specimen gate signal 151. Reference gate signal 150 and the processed scan signals 133/134 are applied to the inputs of AND gate 116 on paths 145 and 109 respectively. Processed scan signal 133/134 is applied also to one input of AND gate 117 on path 109, along with specimen gate signal 151 on path 146.

Clock 140 may conveniently be an oscillator continuously producing a pulse train signal 135 and whose pulse rate is constant during each scan of reference object image 104a and the specimen image 105a. It is preferable that the clock rate be so great that at least several hundred pulses occur during the time required to scan reference image 104a. However, for illustrative purposes pulse train signal 135 of clock 140 is shown to have a repetition rate very much lower than this, with the result that if this illustrative system were to be actually embodied in hardware, inaccuracies due to the lack of resolution caused by this low pulse rate would occur. The output of clock 140 provides one input to each AND gate 141 and 142. The second input to each AND gate 141 and 142 is provided respectively by the output of AND gates 116 and 117. The output of AND gates 141 and 142 is then a series of clock pulses which occurred respectively during each processed scan pulse 133a/134a and 133b/134b and is shown as waveforms 136 and 137. The output of AND gates 141 and 142 is applied on signal paths 143 and 144 respectively, ENABLE gates of reference count (RC) register 119 and specimen count (SC) register 120. The reference and specimen initiate signals are respectively supplied to the CLEAR inputs of RC register 119 and SC register 120. The respective outputs of RC register 119 and SC register 120 are parallel digital outputs on paths 123 and 124, which after completion of measurement scan pulses 133b or 134b are directly proportional to the widths of images 104a and 105a as measured along the light sensitive strips whose images 127 and 128 respectively fall upon images 104a and 105a. Once this apparatus has been calibrated, the values contained in count registers 119 and 120 following completion of pulses 133b or 134b can be used to determine the actual width of specimen 105 at the point where its image 105a coincides with image 128 of the second light sensitive strip. A preferred means for displaying the contents of RC register 119 and SC register 120 for use by the operator is to supply their contents on paths 123 and 124 to reference scan time (RST) display 121 and specimen scan time (SST) display 122.

In operation, it is first necessary to calibrate this apparatus. This can be done conveniently by using for specimen 105 a calibration specimen having a known dimension (calibration width CW) and so positioned on stage 126 that the image of the known width falls on the specimen strip. Scan controller 112 issues a reference initiate pulse 130a and a measurement initiate pulse 131a. The RC and SC count registers 119 and 120 are cleared by initiate pulses 130a and 131a respectively, and the processed calibration scan signal 133 is then used in conjunction with the output of flip-flop 111 to gate clock pulses 135 to form reference and specimen calibration signals 136 and 137 and supply them to, respectively, RC register 119 and SC register 120 and RST and SST displays 121 and 122. An equivalent reference width (ERW) can be defined which, when a specimen having a width ERW is placed on stage 126, will result in the number of reference pulses (RCC) in reference calibration signal 136 exactly equaling the number of calibration pulses (SCC) in specimen calibration signal 137. The ERW for a given calibration specimen is simply the ratio of the RCC to the SCC times CW, since the scan speed is linear with time. The ERW for a particular reference object 104 can be computed by substituting these known values in the formula expressing this relationship:

$$ERW = CW \left( \frac{RCC}{SCC} \right)$$

Once the ERW is known, the apparatus is calibrated. Assuming CW = .000313 in., the counts displayed yield $$ERW = .000313 \left( \frac{18}{17} \right) = .0003314 \text{ in.}$$

It should be emphasized again that the number of counts chosen in this example to occur during the scan of reference object 104 is very much smaller than the several hundred necessary to achieve greatest accuracy.

An operator wishing to measure the dimension of a specimen locates it on stage 126 so that the image of the dimension to be measured falls on the specimen strip, i.e. coincides with dotted line strip 128 in FIG. 1b. As during calibration, scan controller 12 issues a reference initiate pulse 130a and a specimen initiate pulse 131a, resulting in production of a number of clock pulses on signal paths 143 and 144, shown respectively as reference and specimen measurement signals 138 and 139. The ratio of these counts relates specimen width to ERW. The reference and specimen measurement counts (RMC and SMC) are arbitrarily shown to be 17 and 13 respectively. These values are displayed by RST and SST displays 121 and 122, respectively. The operator can then use the ratio of these values as shown in the following formula to determine the width W of specimen 105:

$$W = ERW \left( \frac{SMC}{RMC} \right)$$

Using the previous values, $$W = .0003314 \left( \frac{13}{17} \right) = .000253 \text{ in.}$$

It should be noted that RCC did not equal RMC, having changed from 18 in the former to 17 in the latter case. This change might occur because of thermal dimensional change in the dimension of reference object 104. As a practical matter this cause of such change can be eliminated by choosing the location of reference object 104 sufficiently far from heat sources. The preferred location on or adjacent ocular lens 103 is one such location. Any change in ambient temperature affects both reference object 104 and specimen 105 equally.

The most common source of such changes in the reference counts from calibration to measurement is in the electronics. A possible cause might be drift in clock 140 frequency. Signal processor 107 might start applying a different threshold in producing the squared up processed scan signal from the unprocessed scan signal 132. The response times of the various gates might change. However, none of these changes will cause any appreciable error in the calculation of the unknown dimension. This is because the change, whatever its source, will affect in approximately equal percentages both those signals associated with reference object 104 and those associated with specimen 105 because of the extremely short time between the scan of these two objects, and hence the ratio computed will be unaffected. I.e., the change which a particular electronic element may undergo between the scans of the two light sensitive strips will be very small because the time between the scans is very small. Therefore, the change in the example from 18 counts occuring during the scan of reference object 104 during calibration and the 17 counts recorded later during measurement does not result in error, because whatever caused the decrease in the number of counts recorded from one scan of reference object 104 to the next caused a proportional decrease in the number of counts which would have occurred during the scan of specimen 105 if conditions had remained stable between calibration and measurement. It should be kept in mind that because of the small number of counts used for illustrative purposes, a change of 1 count will introduce a certain error in the measurement operation, but only because of the coarseness of the time increments employed. In the more usual case, many hundreds of counts occur over a single pulse of scan signals 133 or 134. Thus, a change from 796 counts during calibration to 793 counts during measurement for reference object 104 would probably result in a change of 2 counts for a measurement scan of 587 to 585. In fact, such a count variation would result in an error induced by lack of resolution only, of approximately 4 parts in 10000.

Reference object 104 is shown in FIG. 1a as being located on ocular lens 103. However, avoidance of thermal variations allowing it is only necessary that object 104 be located in some focal plane within optical system 110, produce an image which does not spill from the field of view, and be capable of accurate location within the field of view to prevent obscuring the portion of the field of view devoted to specimen image 105a. It is preferable to place reference object 104 at a focal plane other than on stage 126, because on stage 126 reference object 104 would interfere with the positioning of specimen 105, might easily tend to shift its position in the field of view and might undergo dimensional instability caused by substage lighting. When measuring extraordinarily small specimens with high power optical systems, reference object 104 if located on stage 126 would have to be small, and hence would be difficult to accurately manipulate into position. Furthermore, reference object 104 may be simply a mark or a short strip of paint placed directly on a lens of optical system 110, and thus not likely to be lost or damaged. Conveniently, reference object 104 may be formed integrally in ocular lens 103 and thus, when it is desired to change magnifications by changing eyepieces, reference object 104 can be easily changed as well.

While the simple system of FIG. 1a will operate in a perfectly satisfactory manner, it does have limitations where a large number of measurements are to be performed, or where relatively unskilled operators may be employed, who may err in computing the formula above in determining the exact dimension of the measurement object. Accordingly, FIGS. 2a and 2b, taken together, comprise a detailed logic block diagram of a preferred embodiment employing logic and other elements widely available on the market as complete packages. Although the basic theory of operation is identical to that of the apparatus of FIG. 1a, additional capabilities are present. Among these are the capability of: calibrating the apparatus so as to provide an output which expresses the specimen dimension as a preset power of 10 of the actual dimension; electronically selecting the position at which the measurement is to be taken; and displaying not only the field of view on a television monitor, but also the position at which the measurement is taken.

Optical system 110 and signal processor 107 in FIG. 2a are identical to and perform the identical function performed in the apparatus of FIG. 1a. The image processor in FIG. 2a must be, in this preferred embodiment the closed circuit television camera.

The output of the processor 107 on signal path 109 is the typical television camera output signal except for the absence of a grey scale in the video portion, this having been removed by signal processor 107. Such a processed camera output signal is shown by waveform 280 which displays two typical horizontal scan lines of the field of view shown on TV monitor 202 in abbreviated fashion, that for reference scan line 213d and for specimen scan lines 213a–213c. As of course is well known, the usual TV camera output is a composite of three distinct signals, viz. the video, the horizontal sync and the vertical sync signals. Referring to waveform 280, pulses 280a and 280r comprise simplified vertical sync pulses which are used to reset the electron beam in the upper left-hand corner of monitor 202. The horizontal sync pulses, shown generally in waveform 280 as pulses 280c, 280g, etc. cause the beam to be repositioned at the extreme left of the screen, preparatory for another scan. The remaining portions of 280 comprise the video portion of waveform 280 and are exemplified by portions 280d–f, 280j–n, etc.

The processed camera output signal must first be separated into its three constituents. Vertical sync separator and ramp generator (VSS/RG) 201 receives the processed signal, extracts from it each vertical sync pulse, and provides a ramp output signal on path 202, shown as waveform 281, and a pulse output on path 203, shown as waveform 282. Horizontal sync separator and ramp generator (HSS/RG) 204 provides similar ramp and pulse outputs for the horizontal pulses on paths 205 and 206, respectively and shown as waveforms 283 and 284 respectively. Video separator 207 removes the video signal from the camera output signal and places it on path 219. Waveform 285 is the portions of a typical video signal corresponding to the four scan lines coinciding with dashed lines 213a–d on the screen of TV monitor 202. Because of the processing performed by signal processor 107, the video signal has only two voltage levels. The more positive segments, of which portions 285a and 285c are representative, correspond to complete absence of an electron beam and therefore a completely dark screen. The less positive portions, exemplified by segments 285b and 285d, correspond to maximum electron beam intensity with the corresponding scan portions of the monitor 202 screen at maximum brightness.

The vertical ramp signal, waveform 281, is used for two purposes. It is supplied to reference scan enable trigger 208 for the purpose of generating a trigger pulse which initiates the reference timing operation. It is also supplied to line of measure (LOM) vertical select element 209 and compared with a manually adjustable vertical select voltage, generated by manual adjust vertical element 210. LOM vertical select element 209 produces an output on path 211 which is high during the time between the two horizontal sync pulses immediately following the crossing from low to high of the control voltage from manual adjust vertical element 210 by the vertical ramp signal on path 202, and low otherwise.

The horizontal ramp signal from HSS/RG elements 204 is supplied to LOM horizontal position element 212. LOM horizontal position element 212 receives two manually adjustable control voltages which specify the position of the LOM end points in the field of view along which the measurement is performed. Referring to monitor 202 and the image of the field of view displayed therein, typical such LOM's are disclosed as dotted lines 313a–c, although it should be understood that only a single line will be present at any one time. Manual adjust start point element 214a provides a voltage whose level equals the horizontal ramp voltage at the starting point or position of the extreme left-hand end of each LOM. Manual adjust finish element 214b similarly identifies the rightmost point of each LOM. LOM horizontal position element 212 produces, on path 216, a high output when the horizontal ramp signal on path 205 is between the two voltages from manual adjust start and finish point elements 213 and 214, and a low output otherwise. AND gate 215 receives this horizontal position signal and the vertical select signal on path 211, and produces an output put which is high during the time the electron beam in the TV camera (and TV monitor 202) is sweeping along the desired LOM and is low otherwise. The output of AND gate 215, on path 217, is ANDed with the video signal on path 219 by AND gate 218 to produce a measurement pulse on path 220 which is high during the time the electron beam, while scanning along the selected LOM, also sweeps across the specimen 105 dimension to be measured, and low otherwise. The horizontal sync pulses are supplied to LOM vertical select element 209 to allow proper timing of its output pulse and proper selection of the scan line coinciding with the LOM.

The LOM position pulse on path 217 is also supplied to TV monitor 202, along with the processed camera signal waveform. Monitor 202 displays an image of the field of view on its CRT as well as the actual position of the LOM in the image. Logic to be described later permits measurements to be made in several different ways between light intensity changes on the CRT screen caused by the presence of specimen 105.

When measuring the time required to scan between the edges of reference object image 104a, it has been found convenient to record the time for several reference scans between successive vertical pulses for each measurement. Accordingly, reference scan enable trigger 208 provides a high output for a period of several scans, the first and last of which both fall upon reference object image 104a. Two internal voltages are generated by reference scan enable and the high output on path 221 occurs while the vertical ramp signal is between these two voltages. These two voltages must be selected to place the first and last reference object scans upon the reference object itself. The reference scan enable signal on path 221 and the video signal on path 219 are applied to the inputs of AND gate 222 to produce a reference count enable signal on path 223 which is high during the time the scan is sweeping across reference image 104a during the scanning of the reference scan lines and low otherwise.

Figure 2B:
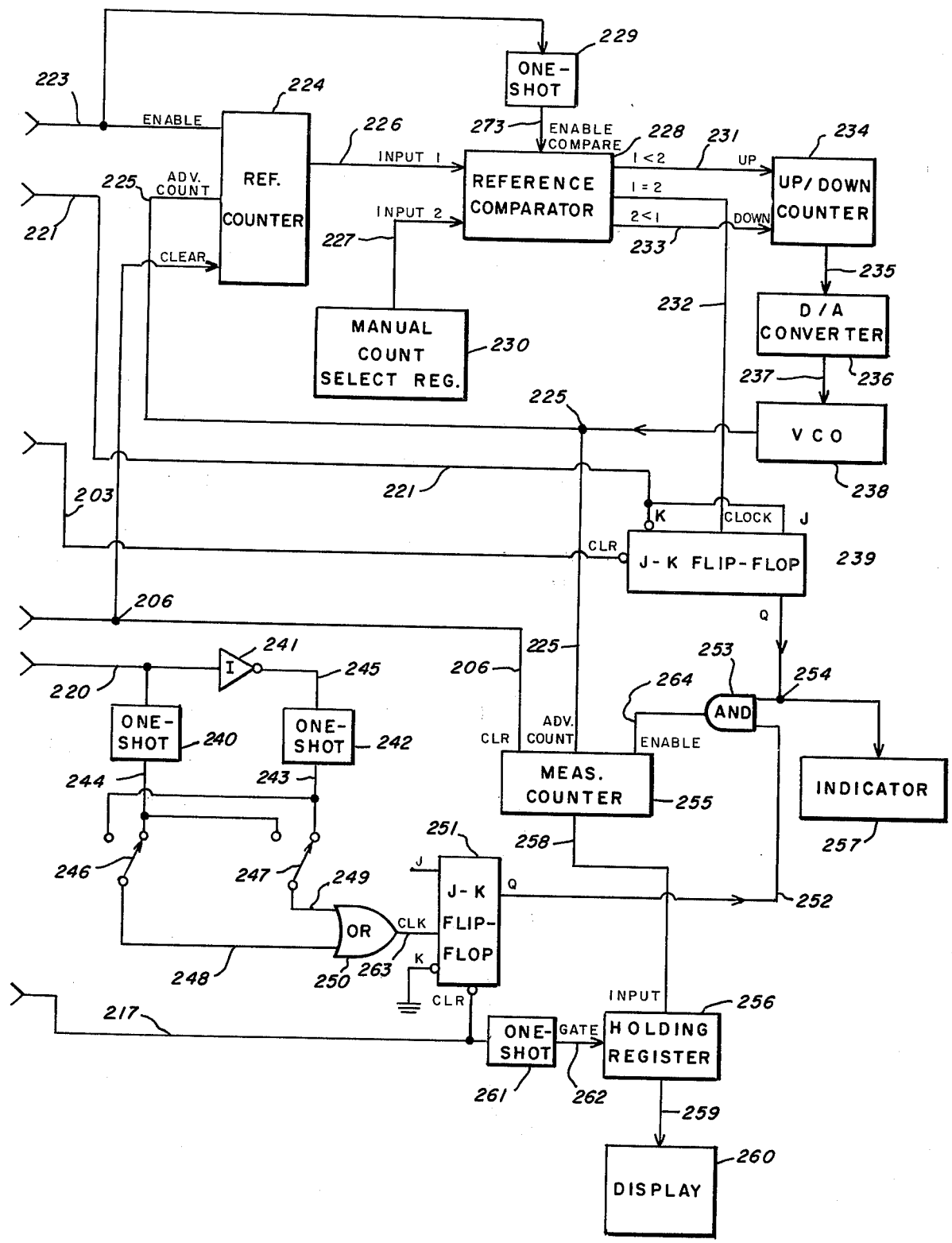

Turning next to FIG. 2b, the reader should be reminded that FIG. 2b is intended to be juxtaposed to FIG. 2a along their respective left and right hand edges to complete the detailed logic diagram. In the further processing performed in computing the reference scan count, reference count enable signal on path 223 is applied to the enable input of reference counter 224. (Reference counter 224 and measurement counter 255 preferably are of the type which operates in the so-called binary-coded-decimal (BCD) mode, allowing the counting to occur in decimal rather than binary. The advantage from the choice is that the operator, most likely completely unfamiliar with binary numbers, can operate instead in the familiar decimal system.) The horizontal sync pulses on path 206 are applied to the CLEAR terminal of reference counter 224 to set it to 0. Each positive-going pulse applied to the ADV. COUNT input of counter 224 advances the recorded count within the counter by 1 when the ENABLE input (path 223) is high. The contents of reference counter 224 is provided in parallel on path 226 to the INPUT 1 terminal of reference comparator 228. As mentioned in conjunction with the description of FIG. 1a, it is desirable that at least several hundred counts occur during the scan of reference object 104; hence at least 3 decimal digits for counter 224 capacity is preferred. If counter 224 operates in BCD format, then manual count select (MCS) register 230 may be a bank of manually selectable 10-position switches of size equal to the decimal digit capacity of reference counter 224. By selecting switch positions properly, it is possible to provide an output signal encoding a decimal integer of the specified number of digits. This output of MCS register 230 is transmitted in parallel on path 227 to the INPUT 2 terminal of reference comparator 228. Responsive to a pulse on its ENABLE COMPARE input, reference comparator 228 produces a pulse on a single one of its three outputs. If the contents of reference counter 224 (INPUT 1) are less than the value selected in MCS register 230 (INPUT 2), the pulse will appear on the "1<2" output path 231. If the contents of reference counter 224 equal the value selected in MCS register 230, the pulse will appear on the "1=2" output path 232, and if the value selected in MCS register 230 is less than the contents of reference counter 224, then the "2<1" output will supply the pulse. One-shot 229 supplies the required enable pulse via path 273 to the ENABLE COMPARE input of comparator 228, responsive to the trailing edge of the reference count enable pulse on path 223. The "1< 2" and the "2<1" outputs are supplied on lines 231 and 233 to, respectively, the UP and DOWN inputs of up/down counter 234 (which may be a binary counter). Each pulse on path 231 supplied to the UP input causes the contents of counter 234 to increase by one. Each pulse applied to the DOWN input of counter 234 causes its contents to decrease by one. The output of up/down counter 234 is supplied on path 235 to D/A converter 236. D/A converter 236 produces an analog voltage output on path 237 whose level accurately follows the digital value of the contents of up/down counter 234. Voltage controlled oscillator (VCO) 238 receives the analog output of D/A converter 236 and provides a signal whose frequency follows the voltage from D/A converter 236. That is, as the contents of up/down counter 234 increases or decreases and the output voltage on path 237 from D/A converter 236 respectively increases and decreases, the output frequency of VCO 238 on path 225 also respectively increases and decreases. The frequency range of VCO 238 for the voltage range of D/A converter 236 should be selected such that the number of pulses emitted at the highest frequency during the time required to scan one line in the RV camera is slightly less than the maximum capacity of reference counter 224. This then ensures that the number of counts will never exceed the maximum capacity of reference counter 224. The output of VCO 238 on path 225 is applied to the ADVANCE COUNT input of reference counter 224, which, when its ENABLE input is high, will advance the value of its contents by one for each pulse from VCO 238.

The "1 = 2" output of comparator 228 is applied to the CLOCK input of J-K flip-flop 239. The reference scan enable pulse provided on path 221, it will be recalled, is a signal which is high for a period of several scans across the reference object image 104a, and is applied to both J and K inputs of J-K flip-flop 239. When both J and K inputs are high a positive-going transition (from low to high) on the CLOCK input will cause the Q output to become high. The Q output is reset to low by each occurance of a vertical pulse on path 203 at the CLR (clear) input, at the end of the bottom-most scan line. A high from the Q output of flip-flop 239 denotes comparison equality achieved and causes indicator 257 to display this fact to the operator. Certain light-emitting diodes will operate directly from logic level voltage and one of this type may be conveniently selected as indicator 257.

The other elements of the diagram of FIG. 2b deal with the means by which the time required to scan specimen image 105a is determined. The measurement signals on path 220 are the basic data input to this portion of the apparatus. Waveforms 286–288 disclose measurement signals A–C produced respectively during the scans of LOMs 213a, 213b, and 213c. For LOMs 213a and 213c, their position pulses are high from a time prior to the instant the video signal changes level at the left hand edge of image 105a to a time subsequent to video signal change caused by the extreme right hand edge of object 105a. Measurement signal A level changes from low to high and vice versa at the left and right hand edges, respectively, of specimen image 105a in FIG. 2a. For LOM 213b, measurement signal B produced by AND gate 218 is gated by the position signal from shortly before to shortly after the existence of video pulse 285f, which corresponds to pulse 287a in waveform 287. For LOM 213b, the LOM position pulse ends before the scan reaches the right hand upwardly-projecting arm of image 105a. Thus, measurement pulse 287a is narrower than measurement pulse 286a. Measurement signal C, waveform 288, has two pulses 288a and 288b, since the inputs to AND gate 218 are both high at two separate times, coinciding with video pulses 285c and 285e.

The measurement signal is applied to one-shot 240 and, through inverter 241, to one-shot 242. Both one-shots 240 and 242 produce a short pulse of predetermined duration upon receiving an input signal transition from low to high. In the case of one-shot 240, this produces the specified pulse on line 244 responsive to a change in the image from light to dark along the line being scanned. Inverter 241 inverts the measurement signal on path 220 and thus causes oneshot 242 to produce its output pulse responsive to each transition along the scan line from dark to light. Contrast selector switches 246 and 247 in conjunction with OR gate 250 determine the type of light intensity changes, and their order, between which measurement is effected. With switches 246 and 247 in the position shown, OR gate 250 produces a pulse on path 263 for every low to high and every high to low transition of the measurement signal. If switch 246 is shifted to its alternate position, then only high to low transitions produce pulses on path 263. Similarly, if switch 247 is shifted to its alternate position, only low to high transitions produce such pulses on path 263.

J–K flip-flop 251 receives a permanent logical 0 (low) on its K input and a permanent logical one (high) on its J input. With these inputs, each pulse applied to the CLOCK input (path 263) will cause the Q output of flip-flop 251 to change state as long as the CLR input is maintained at a logical high. While the scan is sweeping along the LOM, the output of AND gate 215 on path 217 is maintained at a high. At all other times, a logical low is present thereon, causing J–K flip-flop 251 to be held cleared and the Q output on path 252 at this time to be always low. Upon the occurance of the first pulse on path 263 during the scan of the LOM, flip-flop 251 is set and its Q output becomes high. A succeeding pulse on path 263 clears flip-flop 251 and drops the Q output to a logical low. Succeeding pulses on path 263 alternately set and clear flip-flop 251, as long as the scan coincides with the LOM. Presence of a logical high signal on line 252 coupled with the Q output of J-K flip-flop 239 being high (caused by equality having been found during the reference comparing step) causes a high to be placed on the ENABLE input of measurement counter 255. It is preferred that measurement counter 255 performs its functions in the BCD mode, which allows the values recorded therein to be easily displayed as decimal numbers. Each cycle of VCO 238 output on path 225 then advances the contents of measurement counter 255 by one, and this continues for as long as J-K flip-flop 251 is set. When flip-flop 251 is cleared for any reason, counting is disabled for that period of time. Hence, for LOM 213c and the position of switches 246 and 247 shown, counting occurs only during the scan across each of the two vertical arms. Thus, the measurement taken is the sum of the widths of the two vertical arms. Measurement counter 255 is initially cleared by every horizontal sync pulse on path 206, and thus is preset to 0 when the scan line coinciding with the line of measure is scanned.

The output of measurement counter 255 is a parallel transmission via path 258 to holding register 256, which is adapted to record the contents of counter 255 in a convenient fashion. One-shot 261 produces its output pulse responsive to the trailing edge of the LOM position pulse on path 217. The resulting pulse on path 262 is applied to the gate input of holding register 256 and causes the data on path 258 to be stored within holding register 256. Until another pulse is put on its GATE input, the contents of register 256 cannot thereafter be changed. Display 260 can be any device, such as displays 121 and 122 of FIG. 1a, and merely allows easy visual determination of the contents of register 256. If measurement counter 255 is of the preferred BCD type, display 260 should function in the BCD mode as well to show the decimal value of counter 255.

This apparatus is specifically designed for use after calibration in a preferred manner has been done. Briefly, a calibration specimen 105 of predetermined width is placed within the field of view on stage 126. The switches of manual count select register 230 are then adjusted by the operator until the value shown by display 260 is a convenient power of 10 of the width of calibration specimen 105. Any specimen 105 of unknown width placed thereafter in the field of view will produce a value in display 260 which when multiplied by the same power of 10 chosen during calibration, is the unknown dimension. Because of the extreme speed at which the scans occur, only a few seconds at most are required to achieve equality between reference counter 224 and manual count select register, 230 after each change of the latter. In the preferred embodiment, scan controller 112 (FIG. 1a) actually comprises the vertical pulse generator within TV camera 100, and this equality during the scan of specimen 105 is therefore quickly achieved.

The calibration procedure begins with the placing of a calibration specimen 105 of known dimension on stage 126 and within the field of view of optical system 110 with an orientation which causes the known dimension of calibration specimen 105 to extend in parallel with the scan lines of camera 100 and monitor 202. It is preferable that the known dimension of calibration specimen 105 be chosen to be approximately the same width as the apparent or effective width of reference object 104. Manual count select register 230 is then set to some value which, when multiplied by a convenient power of 10 is approximately equal to the known width of calibration specimen 105. E.g., if calibration specimen 105 is the previously assumed 0.000313 in., then manual count select register 230 can, e.g. be set to 300. Vertical ramp signal 281 produced by VSS/RG 201 swings from one to the other voltages generated within reference scan enable element 208 and which define the scan lines during which VCO 238 frequency is adjusted to produce comparison equality. During the occurance of video pulse 285a, the signal on path 223 is changed to a low, disabling the ADV COUNT input of reference counter 224 and effectively locking the number of counts which occurred during video pulse 285a in reference counter 224. The dropping of the signal to a low on path 223 also triggers a pulse from one-shot 229 which enables the comparison in reference comparator 228 between the contents of reference counter 224 and the value selected in manual count select register 230. The contents of up/down counter 234 is caused to decrease by 1 by the pulse on the 2<1 output on path 233 to decrease by 1. Similarly, if the contents of reference counter 234 are less than the value selected in manual count select register 230, a pulse appears on the 1<2 output of reference comparator 228, path 231, which causes the contents of up-down counter 234 to be increased by 1. If counter 234 is incremented by one, the voltage on path 237 from D/A converter 236 is slightly increased, which increases the frequency of VCO 238. Similarly, if up/down counter 234 is decremented the frequency output of VCO 238 is correspondingly decreased. When the horizontal pulse on path 206 which immediately follows each comparison and subsequent alteration of up/down counter 254 occurs, reference counter 224 is cleared and the new VCO 238 frequency is then tested to see whether or not its frequency causes equality between reference counter 224 and the contents of manual count select register 230 after completing a scan of reference object image 104a.

This pattern continues until either equality is found and a pulse issued on the 1 = 2 output of reference comparator 228, or the scan moves out of the reference scan area causing the output of reference scan enable element 208 to become low and remove the high on the ENABLE input of reference counter 224 until the occurance of the next vertical pulse. Upon the occurance of the next vertical pulse the entire procedure begins again until finally the looked for pulse on the 1 = 2 output of reference comparator 228 occurs. This causes J–K flip-flop 239, previously cleared by the vertical sync pulse on path 203, to become set and produce a high on its Q output, which enables one input of AND gate 253 and causes the comparison equality achieved indication from indicator 257.

Measurement counter 255 then records the time necessary to scan the image of calibration specimen 105a by recording the number of oscillator cycles which occur during that time. During calibration, the intent is to adjust manual count select register 230 until the contents of measurement counter 255 is the product of an exact power of 10 and the known width of calibration specimen 105 located on stage 126. Manual adjust start and finish elements 214a and 214b and LOM vertical select element 209 are adjusted so that the LOM displayed on monitor 202 extends completely across and past each side of the known dimension of calibration specimen image 105a. A suitable LOM might be dashed line 213a. For the typical solid calibration specimen, switches 246 and 247 should be placed in the position shown in FIG. 2b. As previously explained, the measurement signal generated during the scan of the line coincident with the LOM position produces a positive-going pulse whose duration corresponds to the width of specimen 105. The positive-going leading edge causes a pulse from one-shot 240 and the trailing edge produces a pulse later on from one-shot 242. These two pulses are ORed together by OR gate 250 and applied to the CLOCK input of J–K flip-flop 251, which has been previously cleared by the start of the LOM position pulse on path 217, corresponding in time to the point on the scan at which the LOM begins. Each pulse applied to the CLOCK input of flip-flop 251 causes the Q output thereof to change. The first pulse from OR gate 250, results from the start of the scan sweep across image 105a and causes the Q output of J–K flip-flop 251 to become high, which, once comparison equality has occured, produces a high output on path 264 to the enable input of measurement counter 255, allowing the output of VCO 238 to begin advancing the contents of counter 255. The trailing edge of the measurement pulse on path 220 causes counting to cease in counter 255 and the trailing edge of LOM position pulse on path 217 causes one-shot 261 to gate the contents of measurement counter 255 into holding register 256 from which it can be displayed by display element 260, to the operator.

The operator then compares the value displayed by display element 260 with the actual width of calibration specimen 105. Say, for example, the contents of measurement counter 255 are displayed as 320. Since the actual width has been assumed to be 0.000313 inch, which when multiplied by the appropriate power of 10 ($10^6$) is not equal to 320, manual count select register 230 must be changed, in this case downwardly to cause VCO 238 to run more slowly. Manual count select register 230 is adjusted and readjusted many times if necessary, until finally the value displayed in display register 260 equals, in the hypothetical example, 313. At this point, the apparatus is calibrated such that specimens 105 of unknown width placed within the field of view on stage 126 will cause the actual width times $10^6$ to be shown by display unit 260. It should be understood that after calibration has been completed, manual count select register 230 must not be altered in any way.

The advantages present in the apparatus of FIG. 1a relating to elimination of errors caused by drift within the electronics are equally present in the apparatus of FIGS. 2a and 2b. If for any reason, equality does not occur during the first reference scan when measurements are being attempted, up/down counter 234 adjusts appropriately to change VCO 238 frequency until equality is achieved. Because measurement of specimen 105 occurs a short time, 20 ms. or less, after equality is achieved even fairly rapid signal drift in the electronic elements will not produce any noticeable errors.

It is possible, when employing a TV camera to transform the light variations caused by the images of reference object 104 and specimen 105 into electrical signals, that the value of the horizontal sweep voltage can be recorded at the instant each mark signal is detected. The sweep voltage difference, if linearly related to the distance between the related mark image pairs can be used as a measure of the time elapsed between the related pairs of mark images. Although this is not considered to be a preferred embodiment, some discussion of it is deemed necessary since arguably, this voltage difference is different from a direct measurement of time. Applicant wishes to include such indirect measurements of time in his references to time recording where appropriate. Particularly in the claims, it is important to understand that recording sweep voltage at the instant each mark signal occurs is simply a different means of recording the actual time.

Another possibly desirable feature provides automatic calibration. MCS register 230 is used in a different manner for this embodiment. It is initially set to a value equal to the actual calibration specimen dimension times a selected power of 10. A switch-selectable calibration mode then employs apparatus which varies oscillator 238 frequency until the number of counts occurring during the scan of the calibration specimen equals that recorded in MCS register 230. The number of oscillator counts which occurred while scanning reference object 104 just previously is recorded and becomes the value against which reference comparison is made during subsequent measuring operations.

These embodiments by no means exhaust the possibilities for alternative designs and features. For example, once the ERW of reference object 104 is known, elements could be added to the device of FIG. 1a to directly and automatically compute arithmetically the unknown width, using the time required to scan image 105a. Reference object 104 need not comprise an actual object, but instead could be a short band of paint or even a line engraved on ocular lens 103. Reference object 104 need not be placed in the focal plane of ocular lens 103, but may be located in any of the other focal planes within optical system 110. It is not, however, preferable to place reference object 104 in the focal plane on stage 126, because of the aforementioned difficulties of alignment and interference between the two objects. The quality of light which triggers each mark signal need not be intensity change. Change in color or polarization can function as this quality as well. Selection apparatus for specimen mark signals can permit inside measurements to be made. There are many other features and advantages which may be employed in accomplishing certain requirements needed for a particular application. These possible differences should not be allowed to obscure the basic concepts of the invention, which are claimed as follows:

I claim

1. In apparatus of the type comprising an optical system projecting a focussed image of a field of view, and an image processor comprising a. at least first and second light sensitive strips on which at least a part of the image falls, each producing along each strip a signal indicating variations along the strip in a preselected quality of light impinging thereon, b. a scanner receiving first and second initiate signals and responsive thereto scanning at a preselected speed along the first and second strips respectively, the light variations, and producing a scan signal encoding the variations in the light quality adjacent the point of scan, and c. a scan controller issuing first and second initiate signals, an improvement for providing a signal indicating the exact distance between third and fourth marks positioned in the field of view to cause focussed images thereof to fall on the second strip and cause detectable variations in said preselected quality of the light, comprising:

a. a reference object having thereon and spaced a preselected distance apart, first and second marks causing said detectable variations in said preselected quality of the light and located within the image path to cause a focussed image of each mark to fall on the first strip;

b. a detector receiving the scan signal and producing first through fourth mark signals occurring at substantially equal times after occurrence of each scan signal variation caused respectively by the first through fourth marks; and c. timing means receiving the mark signals and producing a first time signal encoding the time span between the first and second mark signals and a second time signal encoding the time span between the third and fourth mark signals;

wherein said preselected distance between the first and second marks is a dimension producing a time span encoded in the first time signal substantially equaling the time span encoded in the second time signal when the spacing between the third and fourth marks is a preselected known distance.

2. The apparatus of claim 1, wherein the optical system further comprises a microscope and the improvement further comprises the reference object located adjacent the microscope ocular lense.

3. In apparatus of the type comprising an optical system projecting a focussed image of a field of view, and an image processor comprising
   a. at least first and second light sensitive strips on which at least a part of the image falls, each producing along each strip a signal indicating variations along the strip in a preselected quality of light impinging thereon,
   b. a scanner receiving first and second initiate signals and responsive thereto scanning at a preselected speed along the first and second strips respectively, the light variations, and producing a scan signal encoding the variations in the light quality adjacent the point of scan, and
   c. a scan controller issuing first and second initiate signals, an improvement for providing a signal indicating the exact distance between third and fourth marks positioned in the field of view to cause focussed images thereof to fall on the second strip and cause detectable variations in said preselected quality of the light, comprising:
   a. a reference object having thereon and spaced a preselected distance apart, first and second marks causing said detectable variations in said preselected quality of the light and located within the image path to cause a focussed image of each mark to fall on the first strip;
   b. a detector receiving the scan signal and producing first through fourth mark signals occurring at substantially equal times after occurrence of each scan signal variation caused respectively by the first through fourth marks; and
   c. timing means comprising
      i. an oscillator;
      ii. a first counter receiving the oscillator output signal, the first and second mark signals and a first enable signal, and responsive to the first enable signal, setting to a preselected value, incrementing by a preselected amount responsive to each oscillator cycle occurring between the first and second mark signals, and supplying its contents as a first time signal;
      iii. a second counter receiving the oscillator output signal, the third and fourth mark signals and a second enable signal, and responsive to the second enable signal, setting to a preselected value, incrementing by a preselected amount responsive to each oscillator cycle occurring between the third and fourth mark signals, and supplying its contents as a second time signal; and
      iv. a timer control supplying the first and second enable signals to the first and second counters, responsive to the first and second initiate signals respectively;

wherein the first and second time signals comprise the signal indicating the exact distance between the third and fourth marks.

4. The apparatus of claim 1, wherein the detector further comprises
   a. a first one-shot receiving the scan signal and producing an output signal pulse each time the scan signal changes in a first predetermined fashion;
   b. a second one-shot receiving the scan signal and producing an output signal pulse each time the scan signal changes in a second predetermined fashion different from the first predetermined fashion; and
   c. manually selectable multi-position switching means receiving the one-shot outputs for supplying selected one-shot output pulses as the mark signals, said pulse selection depending on manual selection of switching means position.

5. The apparatus of claim 3, wherein the light-sensitive strips comprise a television camera whose plurality of scan lines comprises the light sensitive strips, and which supplies a video signal encoding the light intensity variations along the scan lines and horizontal synchronization signals indicating the start of the scan of each line and wherein the improvement further comprises manually operable means for supplying a scan line signal specifying a desired scan line, and video signal gating means receiving the scan line and video signals, for supplying the video signal to the detector while the scan line specified by the scan line signal is being scanned.

6. The apparatus of claim 5, wherein the improvement further comprises a television monitor receiving the video signal and displaying an image of the field of view on its screen, and indicator means receiving the scan line signal for supplying an indicator signal to the television monitor causing a visual indication of the location of the scan line specified by the scan line signal to be displayed on the television monitor screen.

7. The apparatus of claim 5, further comprising manually adjustable means recieving the horizontal synchronization and video signals, and having manually adjustable controls specifying first and second line of measure times following each horizontal synchronization signal, wherein said manually adjustable means is for gating the video signal to the detector during the interval between the first and second line of measure times, and for supplying a line of measure signal to the television monitor causing a visual indication of the position of the scan along the scan line at the first and second line of measure times.

8. The apparatus of claim 3, wherein the oscillator is a variable frequency oscillator whose frequency varies monotonically from a lower to a higher frequency as a frequency control input varies monotonically from a first to a second value; and further comprising
   a. a manually alterable register which may be manually set to produce a reference count signal encoding a value duplicating any one of a plurality of values which the first counter is capable of recording; and
   b. a count comparator receiving the reference count signal and the first time signal, and supplyng the frequency control signal, and, responsive to the second mark signal comparing the counts encoded by the reference count signal and first time signal and changing the frequency control signal so as to reduce the difference between the reference count signal and a subsequent first time signal, if not zero.

9. The apparatus of claim 8 wherein the optical system comprises a microscope, and the improvement further comprises the reference object located adjacent the microscope ocular lens.

10. The apparatus of claim 8, wherein the oscillator is a voltage controlled oscillator whose frequency varies monotonically from a lower to a higher frequency as the frequency control signal varies monotonically from a first to a second voltage, and wherein the count comparator further comprises:
  a. a digital circuit providing first, second, and third comparison signals accordingly as the count encoded by the reference count signal is less than, equal to, or greater than the count encoded by the first time signal;
  b. a digital to analog converter receiving an up-down counter signal, converting the digital count encoded therein to an analog voltage representative thereof and falling between the first and second voltage associated with the frequency control signal, and supplying the analog voltage to the oscillator frequency control signal input; and
  c. an up-down counter supplying the count recorded therein to the digital to analog converter, and responsive to the first comparison signal changing its recorded count by a predetermined amount in a direction causing the analog voltage output of the converter to shift toward the first voltage, responsive to the third comparison signal changing its recorded count by a predetermined amount in a direction causing the analog voltage output of the converter to shift toward the second voltage, and remaining constant responsive to the second comparison signal.

11. The apparatus of claim 8, further comprising a display register receiving the first time signal and providing a visual indication of the count encoded therein.

12. A method for calibrating the apparatus of claim 11, comprising the steps of
  a. placing an object having a known dimension capable of producing third and fourth mark signals in the field of view and located so as to place the image of the known dimension along the second light sensitive strip;
  b. comparing the visual indication in the display register with a preselected constant;
  c. reducing the count value recorded in the manually alterable register by a selectable amount if the visual indication in the display register is greater than the preselected constant;
  d. increasing the count value recorded in the manually alterable register by a selectable amount if the visual indication in the display register is less than the preselected constant; and
  e. repeating the above comparing, reducing, and increasing steps until the difference between the visual indication in the display register and the preselected constant is a minimum.

13. The method of claim 12, wherein the preselected constant is a power of 10 of the length of the known dimension expressed in preselected units of length.

* * * * *